(12) United States Patent
McCarthy et al.

(10) Patent No.: US 8,549,078 B2
(45) Date of Patent: Oct. 1, 2013

(54) COMMUNICATIONS SYSTEM PROVIDING LOAD BALANCING BASED UPON CONNECTIVITY DISRUPTIONS AND RELATED METHODS

(75) Inventors: Steven J. McCarthy, Bellevue, WA (US); Darren L. Gardner, Issaquah, WA (US); Shaibal Roy, Sammamish, WA (US)

(73) Assignee: Teamon Systems, Inc., Wilmington, DE (US)

( * ) Notice: Subject to any disclaimer, the term of this patent is extended or adjusted under 35 U.S.C. 154(b) by 3103 days.

(21) Appl. No.: 10/778,613

(22) Filed: Feb. 13, 2004

(65) Prior Publication Data

US 2005/0033841 A1 Feb. 10, 2005

Related U.S. Application Data

(60) Provisional application No. 60/493,625, filed on Aug. 8, 2003.

(51) Int. Cl.
*G06F 15/16* (2006.01)
*G06F 9/46* (2006.01)

(52) U.S. Cl.
USPC ............ 709/206; 709/204; 709/227; 718/102

(58) Field of Classification Search
None
See application file for complete search history.

(56) References Cited

U.S. PATENT DOCUMENTS

| | | | |
|---|---|---|---|
| 5,774,668 A | 6/1998 | Choquier et al. | 370/255 |
| 5,802,292 A | 9/1998 | Mogul | 395/200.33 |
| 5,995,503 A | 11/1999 | Crawley et al. | 370/351 |
| 6,070,191 A | 5/2000 | Narendran et al. | 709/226 |
| 6,178,160 B1 | 1/2001 | Bolton et al. | 370/255 |
| 6,421,732 B1 | 7/2002 | Alkhatib et al. | 709/245 |
| 6,446,114 B1 | 9/2002 | Bulfer et al. | 709/206 |
| 6,549,937 B1 | 4/2003 | Auerbach et al. | 709/206 |
| 6,557,026 B1 | 4/2003 | Stephens, Jr. | 709/203 |
| 6,560,222 B1 | 5/2003 | Pounds et al. | 370/353 |
| 6,615,212 B1 | 9/2003 | Dutta et al. | 707/10 |
| 6,922,832 B2* | 7/2005 | Barnett et al. | 718/1 |
| 7,146,353 B2* | 12/2006 | Garg et al. | 707/2 |
| 2001/0032245 A1* | 10/2001 | Fodor | 709/206 |
| 2002/0112007 A1 | 8/2002 | Wood et al. | 709/206 |
| 2002/0174194 A1 | 11/2002 | Mooney et al. | 709/219 |
| 2003/0095501 A1* | 5/2003 | Hofner et al. | 370/225 |
| 2004/0019659 A1* | 1/2004 | Sadot et al. | 709/219 |

FOREIGN PATENT DOCUMENTS

WO WO0146867 6/2001

OTHER PUBLICATIONS

Web Server Load Balancing System: Resonate Central Dispatch, available at www.networkcomputing.com, 2003.

* cited by examiner

*Primary Examiner* — Azizul Choudhury
(74) *Attorney, Agent, or Firm* — Allen, Dyer, Doppelt, Milbrath & Gilchrist, P.A.

(57) ABSTRACT

A communications system may include a plurality of target servers and a plurality of source servers connected to the Internet via respective different portions thereof. The source servers may be for establishing connections to desired target servers via the Internet, and they may also be subject to connectivity disruptions. Further, the source servers may generate connectivity disruption information for respective target servers. The communications system may further include a dispatcher for collecting the connectivity disruption information from the source servers, and for distributing jobs to the source servers based upon a respective target server associated with each job and the connectivity disruption information for the respective target server.

10 Claims, 2 Drawing Sheets

COMMUNICATIONS SYSTEM PROVIDING LOAD BALANCING BASED UPON CONNECTIVITY DISRUPTIONS AND RELATED METHODS

CROSS-REFERENCE TO RELATED APPLICATIONS

This application claims the benefit of U.S. Provisional Application No. 60/493,625, filed Aug. 8, 2003, which is hereby incorporated herein in its entirety by reference.

FIELD OF THE INVENTION

The present invention relates to the field of communications systems, and, more particularly, to server load balancing and related methods.

BACKGROUND OF THE INVENTION

In a distributed computing environment, jobs are typically spread out across all available servers to provide faster processing and throughput. That is, the workload is distributed to more than one server so that jobs can be processed in parallel, rather than stacking up in the queue of a single machine performing other tasks. In some implementations, the distributed servers may even span different networks and geographical locations.

One example of a load distributing system is disclosed in U.S. Pat. No. 6,070,191. This patent is directed to a server system for processing client requests received over a communication network. The server system includes a cluster of document servers and at least one redirection server. The redirection server receives a client request from the network and redirects it to one of the document servers based upon a set of pre-computed redirection probabilities. Each of the document servers may be an HTTP server that manages a set of documents locally and can service client requests only for the locally-available documents. Documents are distributed across the document servers using a load distribution algorithm. The algorithm uses access rates of the documents as a metric for distributing the documents across the servers and determining the redirection probabilities. The load distribution algorithm attempts to equalize the sum of the access rates of all the documents stored at a given document server across all of the document servers.

Network service providers require high levels of connectivity. Yet, there are many types of failures that can cause connectivity disruptions between one service provider and another. Moreover, network administrators often block certain types of traffic for security or other reasons. Such conductivity failures may negatively impact the performance of typical load balancing systems.

SUMMARY OF THE INVENTION

In view of the foregoing background, it is therefore an object of the present invention to provide a communications system providing enhanced load balancing features and related methods.

This and other objects, features, and advantages in accordance with the present invention are provided by a communications system which may include a plurality of target servers and a plurality of source servers connected to the Internet via respective different portions thereof. The source servers may be for establishing connections to desired target servers via the Internet, and they may also be subject to connectivity disruptions. Further, the source servers may generate connectivity disruption information for respective target servers. The communications system may further include a dispatcher for collecting the connectivity disruption information from the source servers, and for distributing jobs to the source servers based upon a respective target server associated with each job and the connectivity disruption information for the respective target server.

More particularly, the source servers may be geographically spaced apart. The communications system may further include a knowledge base connected to the dispatcher for storing the collected connectivity disruption information.

By way of example, the jobs may be electronic mail (e-mail) jobs. In addition, the communications system may further include at least one load generator for generating jobs, and the dispatcher may distribute the jobs from the at least one load generator to the source servers.

A method aspect of the invention is for distributing jobs to a plurality of source servers for establishing connections to desired target servers via the Internet to perform the jobs. In particular, the source servers may be connected to the Internet via respective different portions thereof, and they may also be subject to connectivity disruptions. The method may include generating connectivity disruption information for the target servers, and distributing jobs to the source servers based upon a respective target server associated with each job and the connectivity disruption information for the respective target server.

A load distributor in accordance with the present invention may include a dispatcher and a knowledge base, such as the ones described briefly above. In addition, a computer-readable medium in accordance with the invention may similarly include a dispatcher module and a knowledge base mode.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
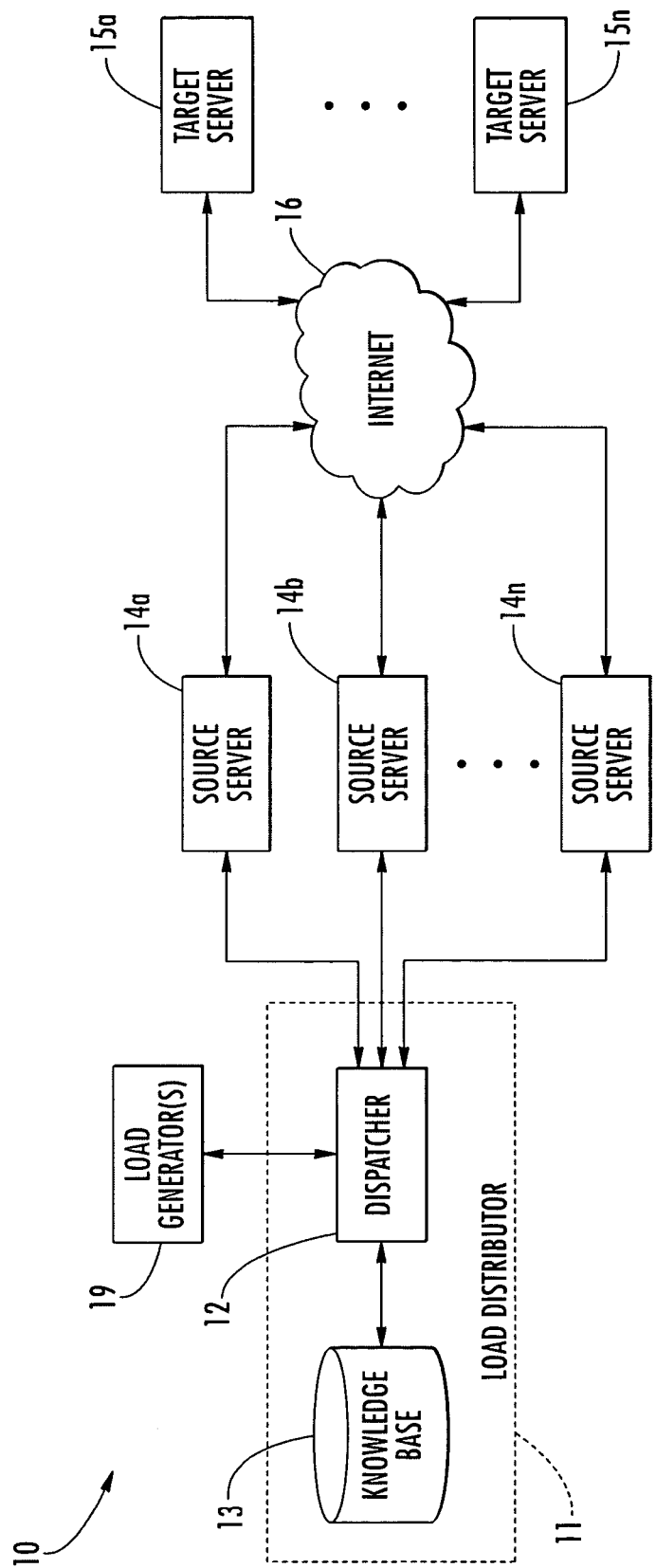
FIG. 1 is schematic block diagram of a communications system in accordance with the present invention providing load balancing based upon connectivity disruption information.

Referring initially to FIG. 1, a distributed network communications system 10 implementing a server selection technique according to one aspect of the invention is now described. The system 10 illustratively includes a load distributor 11 for distributing jobs from one or more load generators 19 to a plurality of source servers 14a-14n. The sources servers 14a-14n are connected to the Internet 16 via respective different portions thereof for establishing connections to desired target servers 15a-15n. That is, the source servers 14a-14n access the Internet 16 via different communications links, for example. This may be because the source servers 14a-14n are geographically spaced apart, such as in the case of a wide area network (WAN), for example.

By way of example, where the load generator 19 generates electronic mail (e-mail) jobs for the source servers 14a-14n to perform, the source servers will establish connections with the target servers 15a-15n for performing respective jobs. In one embodiment, the load generator 19 may be an aggregation engine or module, which periodically causes the appropriate server 14 to poll a mailbox on one of the target servers 15a-15n for a respective user's e-mail, as will be appreciated by those skilled in the art. The load distributor distributes such jobs to the source servers 14a-14n based upon an expected connectivity that a given source server will be able to achieve for the target server 15 in question, as will be described further below.

The load distributor 11 illustratively includes a dispatcher 12 and a knowledge base 13 for the dispatcher. The knowledge base 13 stores information regarding connectivity failures for the source servers 14a-14n for example, with which the dispatcher 12 communicates. By way of example, the load distributor 11 may be implemented as a server or other computer device, and the knowledge base 13 may be implemented as database module thereon.

The dispatcher 12 may similarly be implemented as a software program or module that operates on or in conjunction with a server. In one embodiment, the knowledge base 13 may reside in a data store or memory of a load distributor server on which the dispatcher module 12 operates. Of course, it will be appreciated by those skilled in the art that the dispatcher 12 and knowledge base 13 need not be implemented in a single device. Moreover, the load generator(s) 19 may also be implemented as a software module on the load distributor 11, if desired, although it is illustratively shown as being separate therefrom for clarity of illustration.

The dispatcher 12 receives processing jobs from the load generator 19 and parcels out the received jobs to each of the source servers 14a-14n. The dispatcher 12 uses the connectivity information stored in the knowledge base 13 to decide which of the servers 14a-14n will receive a given job. This is done to increase the likelihood that each job will be able to reach a specific target server 15. When the selected source server 14 is finished with each job, it reports job results to the dispatcher 12.

The dispatcher 12 inspects the results, notes any connectivity failures, and records the connectivity failures in the knowledge base 13. Thus, for example, if source servers 14a-14n which are in different geographical or network locations are experiencing difficulty in reaching one or more of the target servers 15a-15n, subsequent jobs or work requests may relatively easily and seamlessly be routed to source servers at another geographical or network location that is not experiencing connectivity problems.

Those skilled in the art will appreciate that the system 10 may be used with many different types of load generators 19. For the above-noted example of an e-mail delivery system, the dispatcher 12 may receive e-mail messages for delivery to specified recipients. Delivery jobs may be distributed to the servers 14a-14n based upon records of their past connectivity as stored in the knowledge base 13, and job results may be reported back to the dispatcher 12. Job results may also be passed back to the load generator 19 from which the job was received, if desired in certain embodiments.

Figure 2:
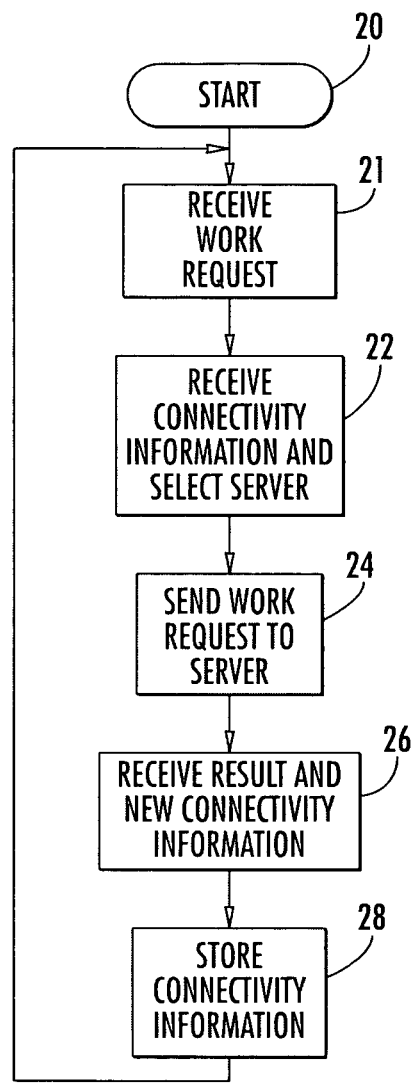
FIG. 2 is a flow diagram illustrating a load balancing method in accordance with the present invention.

Referring additionally to FIG. 2, a method of server selection (i.e., load distribution) in accordance with the invention is now described. Beginning at Block 20, a job, or work request, is first received by the dispatcher 12, at Block 21. Connectivity records for all known servers that are to be accessed as part of fulfilling the job are retrieved from the knowledge base 13, at Block 22, and a source server 14 is selected based on the connectivity records. Connectivity records may be used to decide which source server 14 is to be given the job, or which source server(s) will not be given the job.

The job is then sent to the selected source server, at Block 24. When the selected source server 14 has completed the job, it returns job results, which are received and analyzed, at Block 26. Any connectivity failures evident from the returned results are saved in the knowledge base 13, at Block 28, and the process repeats as illustratively shown. As noted above, a job request result may also be returned to the load generator 19 from which the work request was received, if desired, in some embodiments.

The system 10 and method described above may be used for numerous types of job requests other than e-mail delivery, as will be appreciated by those skilled in the art. It will also be appreciated that the present invention is not limited to performing load distribution merely based upon connectivity failures. That is, indications that a source server 14 experienced no connectivity failures during processing of a job request may also or instead be stored in a knowledge base 13 and used for subsequent server selection operations. Thus, as used herein, "connectivity disruption information" will be understood to pertain to both of these cases, i.e., where the connectivity is either poor or good, and the dispatcher 12 may use either one or both types of such connectivity information to distribute jobs.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
   a plurality of target electronic mail (email) servers each storing emails for different users;
   a plurality of source servers connected to the Internet via respective different portions thereof, said source servers for establishing connections to desired target email servers via the Internet but being subject to connectivity disruptions, and said source servers generating connectivity disruption information for respective target email servers;
   at least one load generator for generating email polling jobs for polling said target email servers for emails for given users; and
   a dispatcher for collecting the connectivity disruption information from said source servers, and for distributing email polling jobs from said at least one load generator to said source servers based upon a respective target email server associated with each email polling job and the connectivity disruption information for the respective target email server.

2. The communications system of claim 1 wherein said source servers are geographically spaced apart.

3. The communications system of claim 1 further comprising a knowledge base connected to said dispatcher for storing the collected connectivity disruption information.

4. A load distributor for distributing jobs to a plurality of source servers for establishing connections to desired target electronic mail (email) servers via the Internet, the target email servers each storing emails for different users, the source servers being connected to the Internet via respective different portions thereof and being subject to connectivity disruptions, and the source servers generating connectivity disruption information for respective target email servers, the load distributor comprising:

at least one load generator for generating email polling jobs for polling said target email servers for emails for given users;

a dispatcher for collecting the connectivity disruption information from the source servers; and a knowledge base connected to said dispatcher for storing the collected connectivity disruption information;

said dispatcher distributing email polling jobs to the source servers based upon a respective target email server associated with each email polling job and the stored connectivity disruption information for the respective target email server.

5. The load distributor of claim 4 wherein the source servers are geographically spaced apart.

6. A method for distributing electronic mail (email) polling jobs to a plurality of source servers for establishing connections to desired target email servers via the Internet, the source servers being connected to the Internet via respective different portions thereof and being subject to connectivity disruptions, and the target email servers each storing emails for different users, the method comprising:

generating connectivity disruption information for the target email servers; and distributing email polling jobs to the source servers based upon a respective target email server associated with each email polling job and the connectivity disruption information for the respective target email server.

7. The method of claim 6 wherein the source servers are geographically spaced apart.

8. The method of claim 6 wherein distributing comprises distributing the email polling jobs from at least one load generator to the source servers.

9. A non-transitory computer-readable medium storing computer-executable instructions for causing a computer to perform steps comprising:

distributing jobs to a plurality of source servers for establishing connections to desired target electronic mail (email) servers via the Internet, the target email servers each storing emails for different users, the source servers being connected to the Internet via respective different portions thereof and being subject to connectivity disruptions, and the source servers generating connectivity disruption information for respective target email servers;

collecting the connectivity disruption information from the source servers; and storing the collected connectivity disruption information;

wherein distributing comprises distributing email polling jobs to the source servers based upon a respective target email server associated with each email polling job and the stored connectivity disruption information for the respective target email server.

10. The non-transitory computer-readable medium of claim 9 wherein the source servers are geographically spaced apart.

\* \* \* \* \*